United States Patent Office 3,590,046
Patented June 29, 1971

3,590,046
PROCESS FOR THE PREPARATION OF
PYRIDOXIN 5'-PHOSPHATE
Sidney Frank Schaeren, Bottmingen, Switzerland, assignor
to Hoffmann-La Roche Inc., Nutley, N.J.
No Drawing. Filed Nov. 20, 1968, Ser. No. 777,480
Claims priority, application Switzerland, Dec. 15, 1967,
17,646/67
Int. Cl. C07d 31/28
U.S. Cl. 260—297V
12 Claims

ABSTRACT OF THE DISCLOSURE

Pyridoxin 5'-phosphate is prepared by treatment of an acetal or ketal of the formula

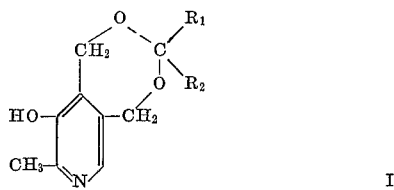

I with polyphosphoric acid followed by hydrolyzation of the polyphosphate thus obtained with water.

BRIEF DESCRIPTION OF THE INVENTION

The present invention is concerned with a novel process for the preparation of pyridoxin 5'-phosphate which is characterized in that a compound of the general formula

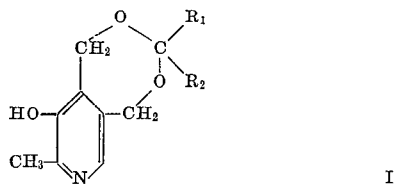

I wherein $R_1$ and $R_2$ are each independently hydrogen, lower alkyl, lower alkenyl, aryl or $R_1$ and $R_2$ taken together are lower alkylene or an acid addition salt thereof, is treated with polyphosphoric acid and the polyphosphate thus obtained is hydrolyzed by addition of water.

The acetals and ketals of Formula I used as starting materials are known compounds and are obtained as intermediate products in the synthesis of pyridoxin.

The aforesaid reaction steps can be illustrated by the following reaction scheme, $R_1$ and $R_2$ having the meaning stated above.

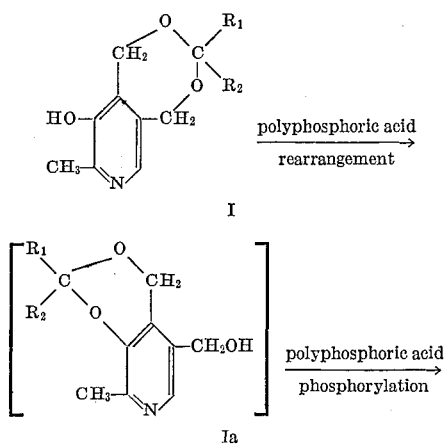

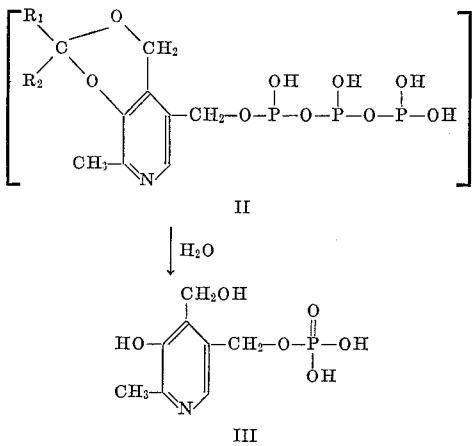

The term "lower alkyl" is understood to include both straight-chain and branched-chain saturated hydrocarbon groups having 1 to 7 carbon atoms, most preferably 1–4 carbon atoms, e.g., methyl, ethyl, i-propyl, etc. The expression "lower alkenyl" includes both straight-chain and branched-chain unsaturated hydrocarbon groups having 1 to 7 carbon atoms, most preferably 1–4 carbon atoms. Examples for lower alkylene groups include lower polymethylene groups with up to 5 carbon atoms. The term "aryl" includes phenyl and substituted phenyl groups. Among the substituted phenyl groups, most preferred are the lower alkyl or lower alkoxy substituted phenyl groups.

BACKGROUND OF THE INVENTION

Pyridoxin 5'-phosphate is a substance which has been known for a long time. According to a known process, pyridoxin 5'-phosphate is obtained starting from pyridoxin by masking the hydroxyl groups in the 3- and 4'-position by treatment with acetone and a strong acid (for example, with polyphosphoric acid or hydrogen chloride), thereupon phosphorylating the hydroxyl group in the 5'-position by means of polyphosphoric acid and subsequently hydrolyzing the reaction product.

This and other methods of preparation have the disadvantage that pure pyridoxin or a salt thereof must first be manufactured. Furthermore, it is necessary to remove the excess acetone prior to the phosphorylation, since acetone can form condensation products in the presence of polyphosphoric acid. Also, in the case of ketalization in the presence of dry hydrogen chloride, very large amounts of hydrogen chloride are necessary.

On the other hand, the process in accordance with the invention has the advantage that an intermediate product from the manufacture of pyridoxin can be used as the starting material and all reaction steps, namely the rearrangement (trans-acetalization or trans-ketalization), the phosphorylation and the hydrolysis, take place in the same reaction vessel without the corresponding reaction products having to be isolated each time.

DESCRIPTION OF THE PREFERRED EMBODIMENTS

Particularly preferred starting compounds of general Formula I are those wherein at least one of the substituents $R_1$ or $R_2$ is other than hydrogen.

In accordance with the present process, an acetal or ketal of Formula I is treated with polyphosphoric acid (manufactured from orthophosphoric acid and phosphorus pentoxide), spontaneous trans-acetalization or trans-ketalization to the compound of Formula Ia occurring.

The amount of polyphosphoric acid used for the trans-acetalization or trans-ketalization is not critical. However, there is preferably used just that amount which is necessary in the following reaction for the phosphorylation.

The phosphorylation can already be effected at room temperature. However, one conveniently phosphorylates by heating the previously obtained reaction mixture at about 30°–60° C. for about 3 to 10 hours. It is preferably heated at about 45° C. for about 6 to 8 hours.

The hydrolysis of the phosphorylation product is effected by addition of water to the polyphosphoric acid reaction mixture of the phosphorylation and, if necessary, subsequent heating up to about 120° C. for about 2 hours. The degree of heating as well as the duration thereof is largely dependent on whether an acetal or a ketal is used as the starting material of Formula I. Thus, acetals are hydrolyzed by heating for about 2 hours at about 70°–120° C., preferably at about 90°–100° C., whereas ketals and, especially, the $O^3,\alpha^4$-isopropylidenepyridoxin 5'-triphosphoric acid ester can be hydrolyzed at milder conditions such as by allowing the reaction mixture to stand overnight at room temperature. However, heating such as for about 2 hours at about 80–100° C. may also be employed for the hydrolysis of ketals.

The isolation of the pyridoxin 5'-phosphate formed from the large excess of aqueous phosphoric acids can be effected by chromatography on activated charcoal, in which case the aqueous, strongly acidic reaction solution must be brought to a pH value of about 2–3 with ammonia prior to such chromatography.

The following examples are presented to better illustrate the present invention and should not be considered as limitative of the scope thereof in any manner.

EXAMPLE 1

170 g. (1.19 mole) of phosphorous pentoxide are placed in a 1500 ml. four-neck flask fitted with a stirrer, thermometer and calcium chloride tube. 220 g. (1.9 mole) of 85 percent orthophosphoric acid are added over a short period with continuing stirring until a homogeneous polyphosphoric acid results. After approximately 30 minutes, the polyphosphoric acid is cooled to room temperature with cold water. 44.6 g. (0.2 mole) of $\alpha^4,\alpha^5$-isobutylidenepyridoxin are then introduced within a short time interval and the mixture is stirred at 45° C. (bath temperature) for 7–8 hours. After removal of the calcium chloride tube, 700 ml. of distilled water are added and the hydrolysis mixture is held at 85–90° C. (oil bath of 100° C.) for 2 hours. Isobutyraldehyde escapes azeotropically with water through the open neck of the flask. The reaction mixture is cooled to 20° C. with an ice-water mixture and slowly adjusted to the pH value 2.5 through a dropping funnel with about 240 ml. of conc. ammonia. The mixture is then brought to a volume of 7.5 l. with distilled water and charged onto a 750 g. active carbon column over a period of one hour. The phosphoric acids are then washed from the column over a 10 hour period with 18 l. of distilled water and, subsequently, the product adhering to the carbon is eluted with 2500 ml. of a pyridine-water mixture and 6000 ml. of distilled water. The combined eluates are evaporated to dryness in water-jet vacuum at 50° C. (rotary evaporator). The crystalline residue is suspended in 300 ml. of methanol and allowed to stand at 0° C. overnight. The next morning, the crystal-mash is isolated on a sintered glass filter and the filter cake suspended with 2× 50 ml. of cold (0° C.) methanol and filtered by means of suction, which on drying in water-jet vacuum at 50° C. overnight, yields pyridoxin 5'-phosphate. UV: $\lambda_{max}$=323 m$\mu$, decomposition point 211–212°.

EXAMPLE 2

Polyphosphoric acid is prepared in a 3 liter four-neck flask fitted with stirrer, thermometer and calcium chloride tube with 310 g. (2.2 mole) of phosphorous pentoxide and 400 g. (3.5 mole) of 85 percent orthophosphoric acid. 78 g. of $\alpha^4,\alpha^5$-ethylidenepyridoxin are introduced at room temperature and the mixture is stirred at a bath temperature of 45° C. for 7–8 hours. 1400 ml. of deionised water are added over a short time interval and the mixture is stirred at a bath temperature of 97° C. for an additional 2 hours. The internal temperature rose to 82° C. and acetaldehyde escaped through the side-neck of the flask. The brown solution is cooled to ca. 20° C. and at this temperature the pH value is adjusted to 2.5 with about 600 ml. of concentrated ammonia. The mixture is then brought to a volume of 15 liters with deionised water and charged onto an active carbon column within ca. 150 minutes. The column is subsequently rinsed with 50 liters of deionised water at a flow-velocity of ca. 3 liters per hour. The product adhering to the carbon is eluted with 5 liters of a pyridine-water mixture and 12 liters of deionised water. The combined eluates are concentrated in water-jet vacuum on the circulatory evaporator and evaporated to dryness on the rotary evaporator at 50° C. in a water-jet vacuum. The crystalline brownish residue is suspended with 600 ml. of methyl alcohol and allowed to stand overnight at 0° C. The next morning, the crystal-mash is filtered by suction over a glass aperture filter converted into a paste by adding sequentially two 100 ml. portions at 0° C. of methyl alcohol and each time filtering off by suction. After drying in a water-jet vacuum at 50° C. overnight, there is obtained pyridoxin 5'phosphate. UV: $\lambda_{max}$=323 m$\mu$.

EXAMPLE 3

310 g. of phosphorous pentoxide are placed in a 3-liter flask fitted with a stirrer, thermometer and calcium chloride tube, treated with 400 g. of 85 percent orthophosphoric acid and stirred for ca. 5 hours until a homogenous solution exists. 83.6 g. of $\alpha^4,\alpha^5$-isopropylidenepyridoxin are added at 20° C. within ca. a 20 minute period, the internal temperature rising to ca. 40° C. The mixture is stirred at a bath temperature of 45° C. for 7–8 hours and there results a light-beige, slightly turbid syrup. 1400 ml. of deionised water are added over a short time period, the internal temperature rising to ca. 55° C. The mixture is subsequently stirred at a bath temperature of 100° C. for an additional 2 hours, the internal temperature rising to 93° C. and acetone distilling off through the open side-neck of the flask. The mixture is then cooled to 20° C. and the pH value of the mixture adjusted to 2.5 with ca. 600 ml. of concentrated ammonia. The mixture is then made up to a volume of 15 liters with deionised water, filtered off from a small amount of precipitated gummy product and the light-yellow solution charged onto an active carbon column. After the reaction solution has been applied, the phosphoric acids are removed by washing overnight with 50 liters of deionised water. The product adhering to the carbon is eluted with 5 liters of a pyridine-water mixture and then with 12 liters of deionised water. The combined eluates are concentrated on the circulatory evaporator in a water-jet vacuum and then evaporated to dryness in the rotary evaporator at 50° C. in a water-jet vacuum. The crystalline residue is suspended in 600 ml. of methyl alcohol and held overnight at 0° C. It is then filtered off over a glass aperture filter, converted into a paste by adding sequentially two 100 ml. portions at 0° C. of methyl alcohol and again filtering by suction each time. After drying in a water-jet vacuum at 50° C. overnight, there is obtained pyridoxin 5'-phosphate in the form of light-beige crystals. UV: $\lambda_{max.}$=323 m$\mu$.

EXAMPLE 4

Polyphosphoric acid is prepared in a 3-liter flask fitted with thermometer, stirrer and calcium chloride tube by mixture of 310 g. of phosphorous pentoxide and 400 g. of 85 percent orthophosphoric acid. 89.5 g. of $\alpha^4,\alpha^5$-butylidenepyridoxin are added at 20° C. and the mixture is stirred at a bath temperature of 45° C. for 7–8 hours, resulting in a brown slightly turbid syrup. 1400 ml. of deionised water are then added over a short time interval, the bath is heated to 100° C. and the mixture is stirred for two hours. The internal temperature of the reaction mixture rises to 88° C. and butyraldehyde escapes through the open side-neck of the flask. The mixture is thereupon cooled to 20° C. and at this temperature the pH value is adjusted to 2.5 with ca. 600 ml. of concentrated ammonia. The mixture is then brought to a volume of 15 liters with deionised water and charged onto an active carbon column during ca. 150 minute period. The phosphoric acids are washed out with 50 liters of deionised water (flow-velocity ca. 3.5 liters per hour). The product adhering to the carbon is eluted with 5 liters of a pyridine-water mixture and with 12 liters of deionised water. The combined eluates are concentrated in a water-jet vacuum on the circulatory evaporator and then concentrated completely to dryness in the rotary evaporator at 50° C. in a water-jet vacuum. The crystalline residue is suspended with 600 ml. of methyl alcohol and allowed to stand overnight at 0° C. It is then filtered on a glass aperture filter and sequentially converted two times into a paste with 100 ml. portions at 0° C. methyl alcohol and each time dried by means of suction. After drying in a water-jet vacuum at 50° C. overnight, there is obtained pyridoxin 5′-phosphate in the form of beige crystals.

UV: $\lambda_{max.} = 323$ m$\mu$.

EXAMPLE 5

Polyphosphoric acid is manufactured in a 3-liter flask fitted with thermometer, stirrer and calcium chloride tube by mixture of 310 g. of phosphorous pentoxide and 400 g. of 85 percent orthophosphoric acid. 103 g. of $\alpha^4,\alpha^5$-benzylidenepyridoxine is added at room temperature and the mixture is subsequently stirred for 7–8 hours at a bath temperature of 45°, resulting in a brown turbid syrup. This is treated with 1400 ml. of deionised water, whereupon an odor of benzaldehyde immediately occurs. The mixture is stirred for 2 hours at a bath temperature of 105° C. and the water and benzaldehyde vapors are drawn off with a water-jet pump under vacuum. The mixture is cooled to 20° C. and the pH value adjusted to 2.5 with ca. of 600 ml. of concentrated ammonia. The mixture is thereupon brought to a volume of 15 liters with deionised water. In order to remove small amounts of gummy fractions present, the mixture is filtered and the solution is then charged onto an active carbon column over a 3 hour period. The phosphoric acids are washed away with 50 liters of deionised water (flow velocity 3.5 liters per hour) and the product adhering to the carbon is eluted with 5 liters of a pyridine-water mixture and with 12 liters of deionised water. The combined eluates are concentrated to dryness in the rotary evaporator at 50° C. in water-jet vacuum. The solid residue is suspended with 600 ml. of methyl alcohol and allowed to stand overnight at 0° C. The crystal suspension is then filtered off by suction over a glass aperture filter, sequentially converted two times into a paste with 100 ml. portions at 0° C. of methyl alcohol. In so doing, in each case it is again filtered off by suction to dryness. After drying overnight at 50° C. in a water-jet vacuum, there is obtained pyridoxin 5′-phosphate in the form of beige crystals. UV: $\lambda_{max.} = 323$ m$\mu$.

What is claimed is:

1. Process for the preparation of pyridoxin 5′-phosphate, wherein a compound of the general formula

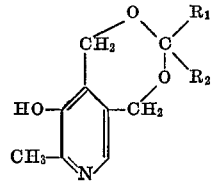

(I)

wherein $R_1$ and $R_2$ each independently are hydrogen, lower alkyl, lower alkenyl, aryl selected from the group consisting of phenyl, lower alkyl phenyl and lower alkoxy phenyl, or $R_1$ and $R_2$ taken together are lower alkylene or an acid addition salt thereof, is treated with polyphosphoric acid and the polyphosphate thus obtained is hydrolyzed by addition of water.

2. The process of claim 1 wherein at least one of the substituents $R_1$ and $R_2$ in the starting material is not hydrogen.

3. The process of claim 1 wherein said phosphorylation is carried out at a temperature between about room temperature and about 60° C.

4. The process of claim 3 wherein said phosphorylation is carried out during a duration of about 3 to 10 hours.

5. The process of claim 1 wherein said hydrolysis of the phosphorylation product is carried out at a temperature of from about room temperature to about 120° C.

6. The process of claim 1 wherein said starting material is $\alpha^4,\alpha^5$-isobutylidenepyridoxin.

7. The process of claim 1 wherein said starting material is $\alpha^4,\alpha^5$-ethylidenepyridoxin.

8. The process of claim 1 wherein said starting material is $\alpha^4,\alpha^5$-isopropylidenepyridoxin.

9. The process of claim 1 wherein said starting material is $\alpha^4,\alpha^5$-butylidenepyridoxin.

10. The process of claim 1 wherein said starting material is $\alpha^4,\alpha^5$-benzylidenepyridoxin.

11. A process for the preparation of compounds of the formula

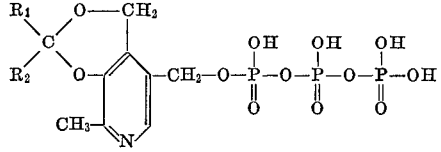

(II)

wherein $R_1$ and $R_2$ are each independently hydrogen, lower alkyl, lower alkenyl, aryl selected from the group consisting of phenyl, lower alkyl phenyl and lower alkoxy phenyl or $R_1$ and $R_2$ taken together are lower alkylene said process comprising treating a compound of the formula

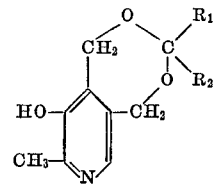

I wherein $R_1$ and $R_2$ are as above with polyphosphoric acid.

12. The process of claim 11 wherein said starting material is $\alpha^4,\alpha^5$-isopropylidene pyridoxin.

References Cited

UNITED STATES PATENTS

| | | | |
|---|---|---|---|
| 3,365,460 | 1/1968 | Yoshikawa et al. | 260—297.5 |
| 3,124,587 | 3/1964 | Schorre | 260—297.5 |

ALAN L. ROTMAN, Primary Examiner

U.S. Cl. X.R.

260—297.5